(12) United States Patent
Sato et al.

(10) Patent No.: US 6,229,573 B1
(45) Date of Patent: May 8, 2001

(54) SYNCHRONIZATION CONTROL CIRCUIT

(75) Inventors: Koichi Sato; Takashi Suzuki, both of Yokohama; Riichiro Yoshida, Ebina, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/263,489

(22) Filed: Mar. 8, 1999

(30) Foreign Application Priority Data

Mar. 13, 1998 (JP) .................................................. 10-062681
Dec. 10, 1998 (JP) .................................................. 10-351441

(51) Int. Cl.$^7$ .................................................. H04N 9/475
(52) U.S. Cl. ............................ 348/516; 348/564; 348/565
(58) Field of Search .................................... 348/512, 513, 348/516, 518, 536, 540, 541, 565, 567, 564

(56) References Cited

U.S. PATENT DOCUMENTS

| 4,623,915 | * | 11/1986 | Bolger .................................. 348/566 |
| 4,987,493 | * | 1/1991 | Canfield et al. ..................... 348/567 |
| 5,285,282 | * | 2/1994 | Cavazos et al. ..................... 348/561 |
| 5,294,983 | * | 3/1994 | Ersoz et al. ......................... 348/521 |
| 5,299,007 | * | 3/1994 | Saeger et al. ........................ 348/503 |
| 5,369,444 | * | 11/1994 | Ersoz et al. ......................... 348/567 |
| 5,434,625 | * | 7/1995 | Willis ................................... 348/567 |

FOREIGN PATENT DOCUMENTS 3-70275   3/1991   (JP) .

* cited by examiner

Primary Examiner—Reinhard Eisenzopf
Assistant Examiner—Trang U. Tran
(74) Attorney, Agent, or Firm—Pillsbury Winthrop LLP

(57) ABSTRACT

In a synchronization control circuit according to the present invention, an image can smoothly be switched to another without distortion due to switching between sync signals to be displayed. The phases of sync signals of input video signals A and B are compared with each other in a phase difference detecting section, and the sync signal of one (B) of the signals is matched with that of the other signal A. When signal A is switched to signal B, an image is displayed in response to the corrected sync signal of signal B (corresponding to the sync signal matched with that of signal A). As a result, the synchronization state of signal A is maintained on a display screen, and the image can smoothly be switched without distortion.

12 Claims, 12 Drawing Sheets

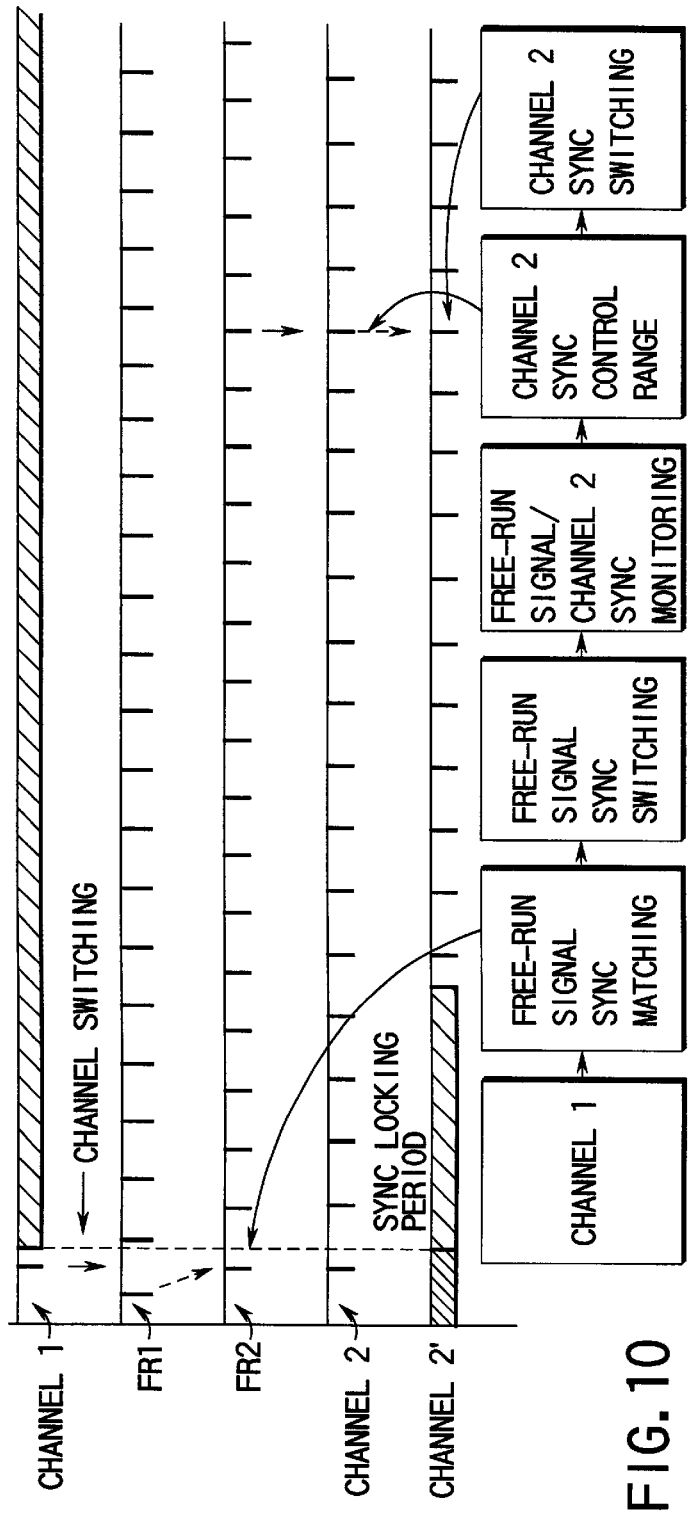
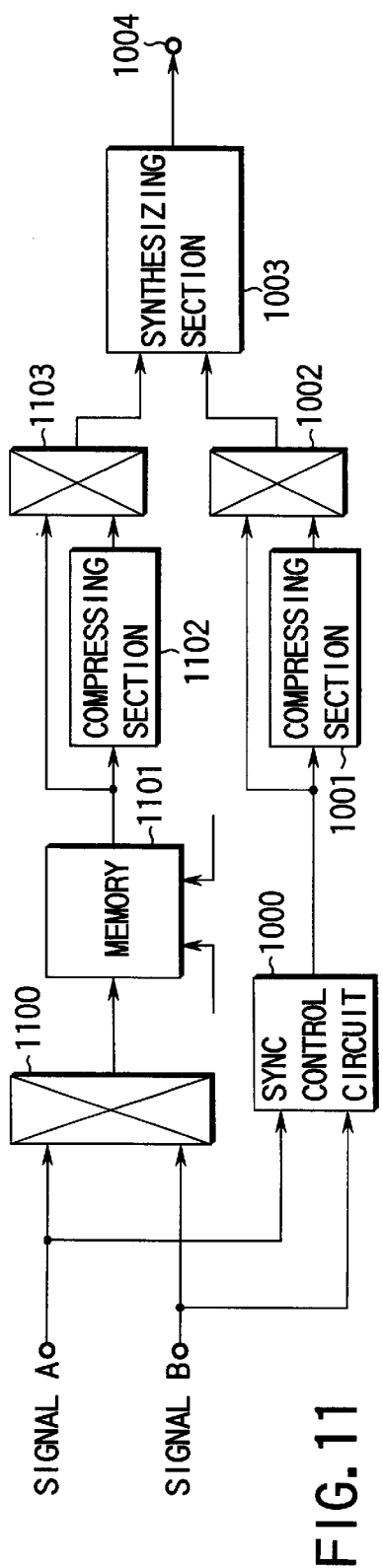
FIG. 10
FIG. 11

SYNCHRONIZATION CONTROL CIRCUIT

BACKGROUND OF THE INVENTION

The present invention relates to a synchronization control circuit which is effective in simultaneously displaying a plurality of screens in a television set and, more specifically, to a synchronization control circuit for smoothly switching between sync signals to prevent an image from being distorted when the image is switched to another.

Nowadays a number of television (TV) broadcasts such as terrestrial broadcasting, satellite broadcasting and satellite communications broadcasting are provided; accordingly, the number of channels will be increased more and more in the future. TV receivers capable of displaying a plurality of screens at the same time have already appeared, and receivers having a function of simultaneously reproducing graphics images other than broadcasts are increasing in number.

In such a receiver capable of displaying a plurality of screens at once, horizontal and vertical sync signals for an output screen to be displayed on a display are generated based on the sync signal of an image of one of input sources. However, the receiver has a drawback in which a sync signal or image is distorted when the sync signal is switched to another in accordance with channel switching.

In particular, as a device for selectively displaying asynchronous input video signals A1 and B1, there is a display device having its own sync signal generator for generating a sync signal irrespective of sync signals of both the input video signals A1 and B1. The display device necessitates a period of time during which the phase of an internal sync signal (control signal for display) generated by the sync signal generator is synchronized with that of the sync signal of a selected input video signal. In the display device, when one selective state of the input video signal is switched to another, the phase of a vertical sync signal is suddenly changed between the sync signal of the input video signal and the internal sync signal; therefore, a time corresponding to several fields to several tens of fields is required to lock the sync signal, and the sync signal (image) is distorted.

Therefore, a technique of blacking out an image until synchronization is stabilized to prevent it from being displayed, is usually adopted.

In a TV receiver simply for full-screen display, such a blackout is not a serious problem. However, in a TV receiver having a function of simultaneously displaying graphics images which are not involved in channel switching and a received image, the above distortion is a problem.

In a receiver for displaying a graphics image along with an image of an input video signal, if the images are blacked out in accordance with switching between sync signals, a great problem occurs in which auxiliary information of the graphics image disappears during a period of time corresponding to several fields to several tens of fields.

There is a personal computer as an example of a device for displaying graphics. In the computer, all sync signals are generated by means of a system clock of the body thereof and, even though a channel is switched while a moving image is being displayed, its surrounding graphics is not distorted; however, the moving image itself is distorted because the synchronization of a processing system is switched. Since, furthermore, the image is always displayed by asynchronous output signals, a hindrance such as a jump and a continuous display of the image is caused by a difference in synchronization.

On the other hand, a TV receiver mainly aims at displaying a moving image and thus needs to avoid the above hindrance as much as possible.

As described above, in the TV receiver for displaying images from a plurality of sources on a single screen, when a source of a sync signal for display is switched, an image is blacked out and a sync signal (image) is distorted for a while.

BRIEF SUMMARY OF THE INVENTION

It is accordingly an object of the present invention to provide a synchronization control circuit capable of correcting an image distortion due to switching between sync signals for display and smoothly changing an image to another in accordance with the switching between sync signals.

In order to attain the above object, a relationship in phase between the sync signals of a plurality of signals is detected to detect a relationship in phase between a sync signal currently used for display and a sync signal to be displayed from now on, and the phase of the latter sync signal is brought close to that of the former sync signal. When a difference between both the phases falls within a permissible range, the phase-corrected sync signal is used as one for display.

Since, therefore, a simple synchronization state between a video which is currently being displayed and a video which is to be displayed from now on can be obtained, no image distortion occurs on a display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a timing chart for explaining an operation of the circuit shown in FIG. 9;

FIG. 11 is a block diagram showing an example of the constitution of a television receiver to which the present invention is applied.

DETAILED DESCRIPTION OF THE INVENTION

Figure 1:
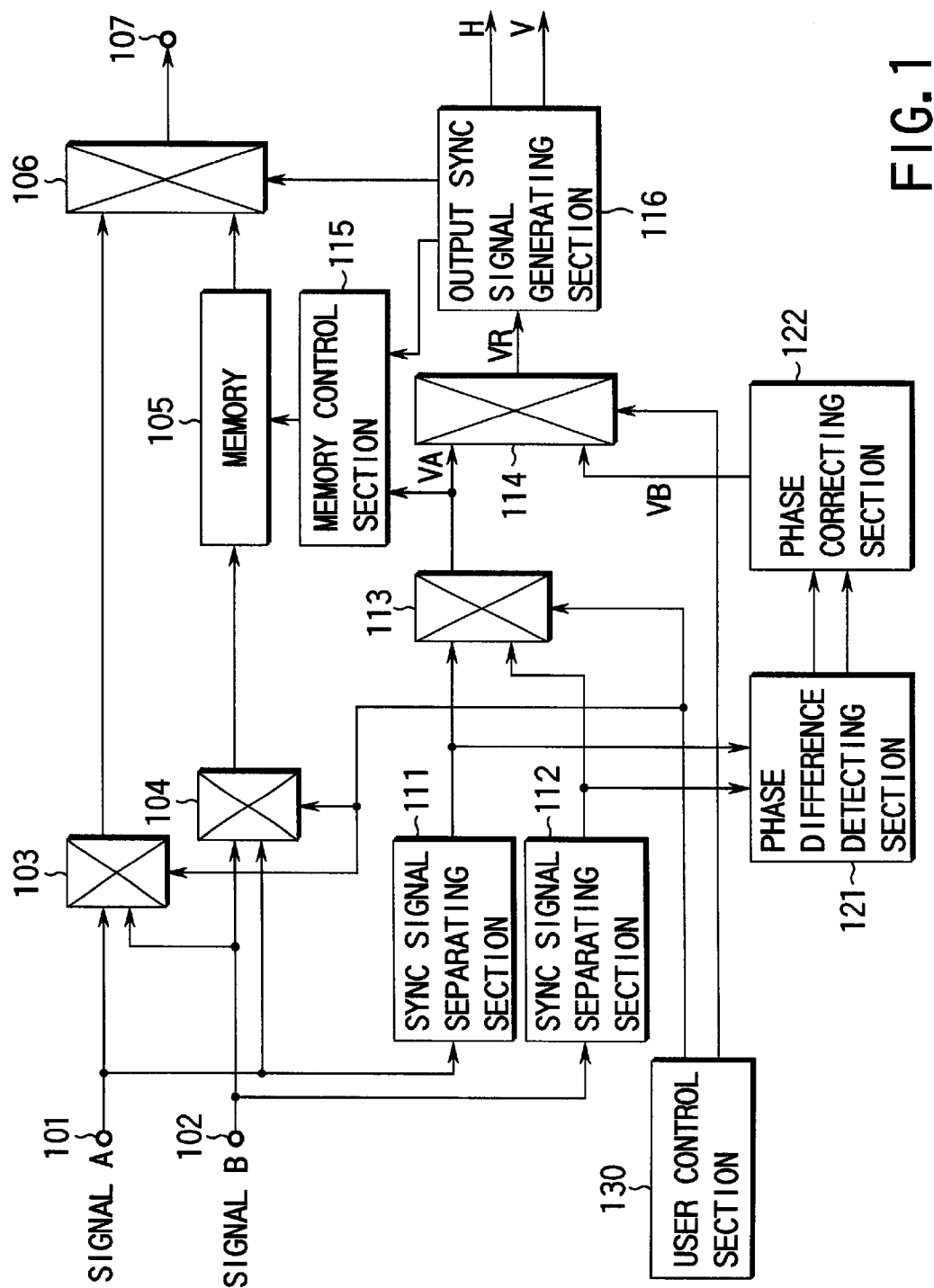
FIG. 1 is a block diagram illustrating a synchronization control circuit according to a first embodiment of the present invention.

FIG. 1 illustrates a synchronization control circuit according to a first embodiment of the present invention. The circuit includes input terminals 101 and 102 which receive first and second video signals A and B, respectively.

The input terminals 101 and 102 are connected to their corresponding input terminals of a selector 103, and the selector 103 can select one of input signals and output it. The input terminals 101 and 102 are also connected to their corresponding input terminals of a selector 104, and the selector 104 can select one of input signals and output it. When the selector 103 selects the input video signal A, the selector 104 selects the input video signal B. When the latter selects the signal A, the former selects the signal B.

An output signal of the selector 103 is supplied to one of input terminals of a selector 106, and that of the selector 104 is supplied to the other input terminal of the selector 106 via a memory 105. The memory 105 is a phase adjusting circuit. An output of the selector 106 is guided to an output terminal 107.

The input video signals A and B are supplied to sync signal separating sections 111 and 112, respectively. The separated sync signals are supplied to first and second input terminals of a selector 113 and also to a phase difference detecting section 121. An output of the selector 113 is supplied to one of input terminals of a selector 114. The sync signal is corrected by a phase correcting section 122 and supplied to the other input terminal of the selector 114.

The phase difference detecting section 121 detects a difference in phase between the two sync signals, and the phase correcting section 122 corrects their phases so as to match the phase of one of the sync signals with that of the other sync signal and outputs a phase-corrected sync signal. In the circuit of FIG. 1, a difference in phase between vertical sync signals VA and VB is detected, and the phase of signal VB is matched with that of signal VA.

The sync signal selected by the selector 114 is input to an output sync signal generating section 116. This section 116 generates and outputs a horizontal sync signal H and vertical sync signal V which are synchronized with the sync signal output from the selector 114. These signals H and V are used in a display at the subsequent stage.

The selective states of the selectors 103, 104, 113 and 114 are switched in response to a control signal output from a user control section 130. A memory control section 115 controls an image signal write phase in the memory 105 in response to a sync signal output from the selector 113 and controls an image signal read phase in the memory 105 in response to a sync signal output from the output sync signal generating section 116. The section 116 supplies a switch timing signal to the selector 106.

Figure 2:
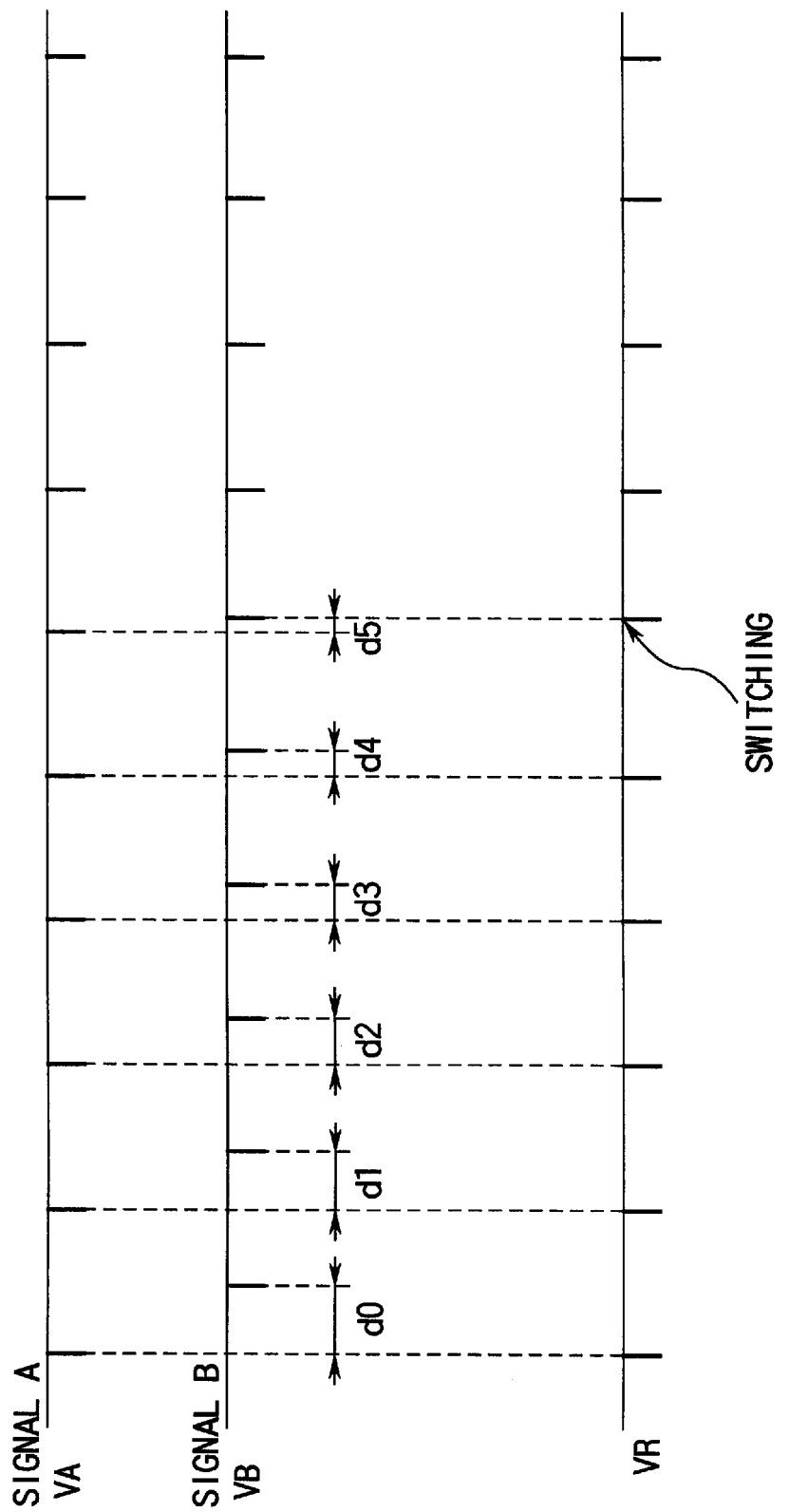
FIG. 2 is a timing chart for explaining an operation of the circuit shown in FIG. 1.

FIG. 2 is a timing chart for explaining an operation of the circuit having the above constitution.

The timing chart shows phases of vertical sync signals VA and VB of signals A and B. In this example, signal A (synchronous main signal) is switched to signal B. The whole circuit fulfills the following function. A phase difference $d$ between the vertical sync signals VA and VB is detected. When a user makes a request for switching between the sync signals, the phase of the vertical sync signal of signal B is corrected using the phase difference $d$ to correct a phase deviation of the output vertical sync signal VB. When the phase of the vertical sync signal VB is brought close to that of the vertical sync signal VA of signal A and a phase difference between the signals VA and VB reaches a phase difference d4 within a permissible range, the vertical sync signal VB of signal B is adopted.

The phase correcting section 122 corrects the phase of the vertical sync signal VB and supplies it to the selector 114. If a fixed period of time elapses from the time when the signal switching operation is performed, the selector 114 selects the vertical sync signal VB from the phase correcting section 122 at any time since the phase of the vertical sync signal VB is almost close to that of the vertical sync signal VA. The operation of the selector 114 is controlled by a timing signal generated by a user control section 130. Thus, as shown in FIG. 2, the vertical sync signal VR output from the selector 114 is not distorted before and after it is switched.

At the same time, in the memory 105, an amount d0 of delay of an image signal is corrected. After that, the selector 106 performs its select operation at the same time when the vertical sync signal is switched.

In the above state where the display state of signal B is switched to that of signal A, the selectors 113, 114 and 106 simply perform their select operations. Thus, even though the switching between two asynchronous video signals is done, the distortion of sync signals can be suppressed to the minimum, and the signals or images can be switched on the screen without being blacked out.

If, in particular, the phase of vertical sync signals is widely varied, the distortion of images is greatly increased on the display screen. However, when there is a slight difference in phase between vertical sync signals VA and VB before and after the input video signals A and B are switched to each other, the phases of sync signals or the phase of internal generated sync signals and that of sync signals of the input video signals can be matched during a vertical blanking period; therefore, no image distortion is detected on the display screen. This characteristic is utilized in the present invention. More specifically, when a user makes a request for switching between channels, a phase difference between the currently-displayed sync signal and a new sync signal is detected, and the phase of the new sync signal is corrected based on the detected phase difference, with the result that the former sync signal can be switched to the latter one without any image distortion. The phase of a new video signal can also be synchronized with the new sync signal by the memory 105 and memory control section 115.

The above-described circuit of the first embodiment can also be utilized as follows. An image of signal B is displayed as the initial state and the display is synchronized with signal B. The selectors 103 and 106 then select signal B, while the selector 104 selects signal A. Moreover, the selector 114 selects the vertical sync signal VB corrected by the phase correcting section 122. In order to switch signal B to signal A, the selector 113 has only to select an output of the sync signal separating section 111, the selector 114 has only to select a sync signal out of the selector 113, and the selector 106 has only to select an image signal out of the memory 105, since the sync signal for display of signal A is originally matched with that of signal B.

The present invention is not limited to the above first embodiment.

Figure 3:
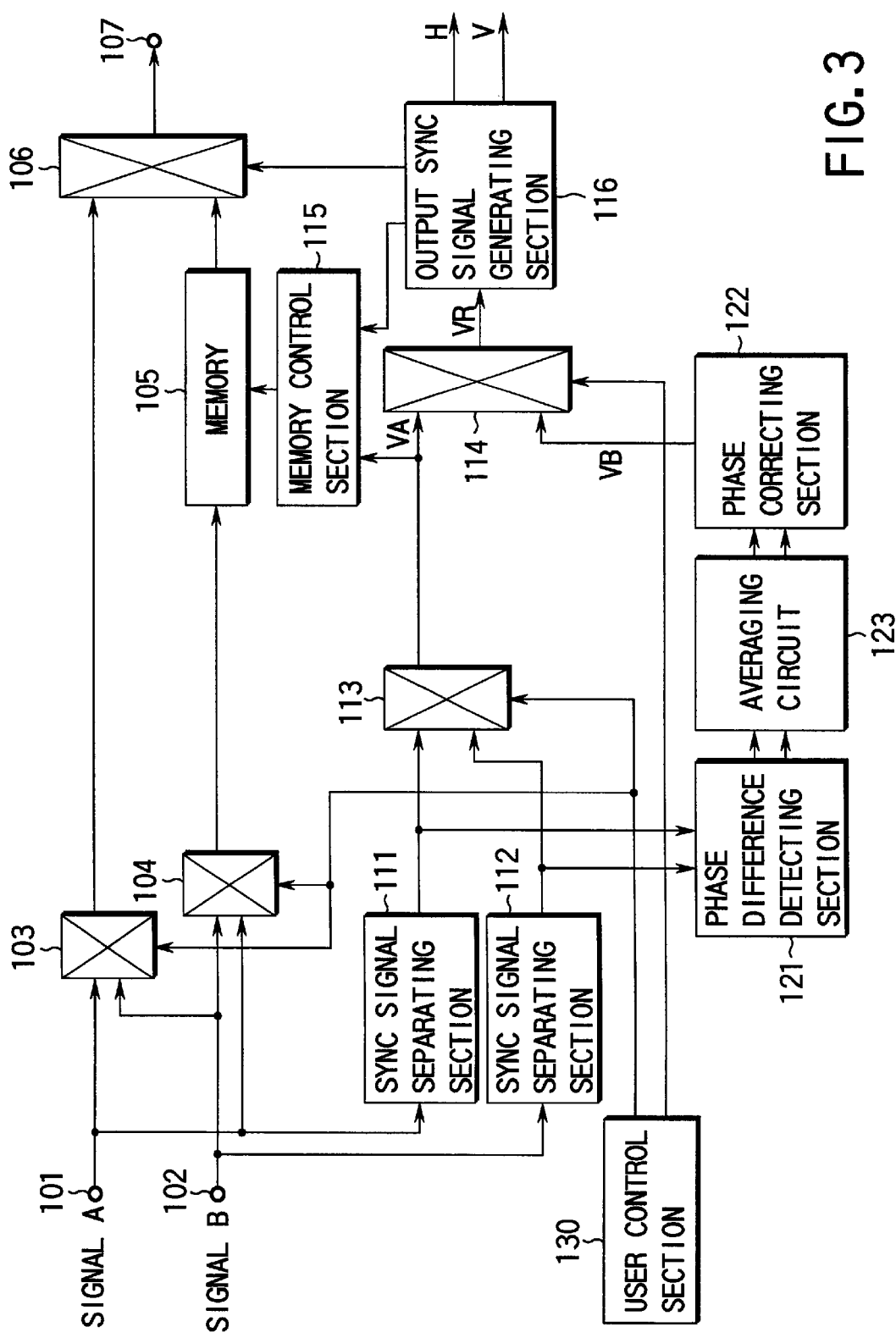
FIG. 3 is a block diagram illustrating a synchronization control circuit according to a second embodiment of the present invention.

FIG. 3 illustrates a synchronization control circuit according to a second embodiment of the present invention. The second embodiment differs from the first embodiment in that an averaging circuit 123 is provided between the phase difference detecting section 121 and phase correcting section 122. Except for this, the first and second embodiments are the same.

In the circuit shown in FIG. 3, a corrected signal is not generated directly from a phase difference signal, but values of several fields or frames of the phase difference are added, and the added values are averaged for each field or each frame, thereby improving in precision of phase correction.

The above method is effective in that an image signal is a nonstandard one which is reproduced in a specific manner by, e.g., a VTR. If phase differences between two signals are averaged in the fields, an almost fixed value is obtained. Therefore, even though an input signal has a slight fluctuation in phase, the sync signals can be corrected with a slight phase difference.

Figure 4:
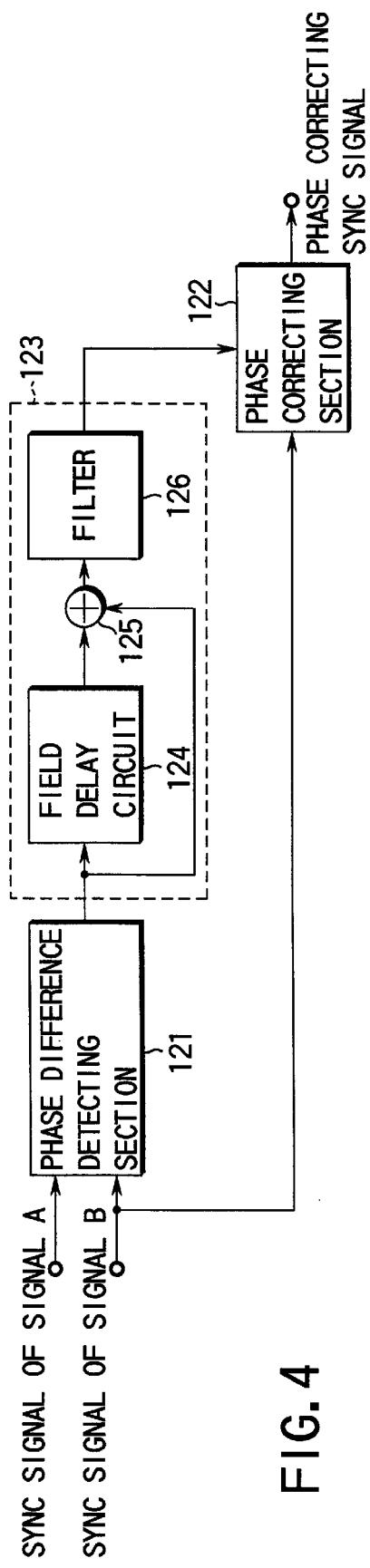
FIG. 4 is a cutaway diagram of the circuit illustrated in FIG. 3.

FIG. 4 is a block diagram specifically showing the constitution of the foregoing phase difference detecting section 121, phase correcting section 122 and averaging circuit 123. The averaging circuit 123 includes a delay circuit 124 for delaying a phase difference d by one field or several fields, an adder 125 for adding an input and an output of the delay circuit 124, and a filter 126 for smoothing an output of the adder 126. In response to an output of the filter 126, the amount of phase of a sync signal separated from the signal B is controlled. Therefore, even though an input signal has a slight fluctuation in phase, the sync signals can be corrected, with a slight phase difference, by averaging the amounts of phase of the sync signals.

Figure 5:
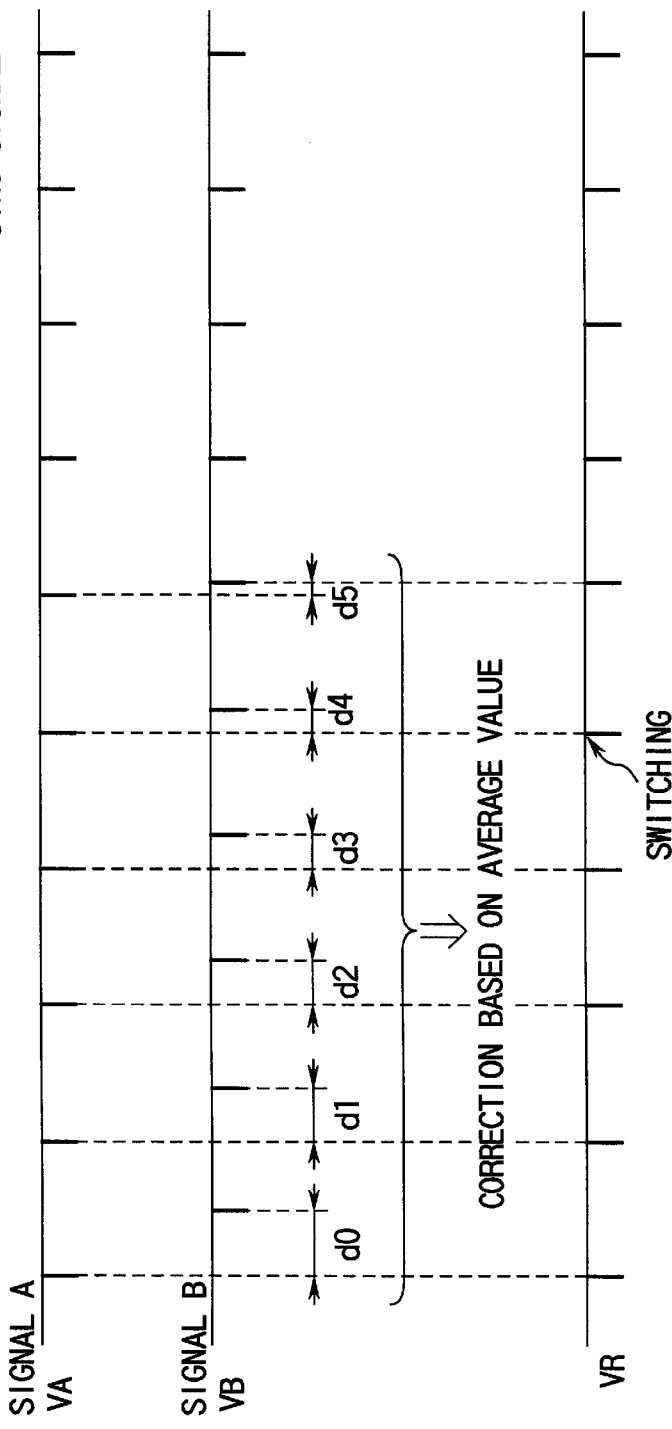
FIG. 5 is a timing chart for explaining an operation of the circuit shown in FIG. 3.

FIG. 5 is a timing chart showing an operation of the circuit according to the above second embodiment. The vertical sync signal VB (=VR) is one corrected based on the averaged phase difference.

Figure 6:
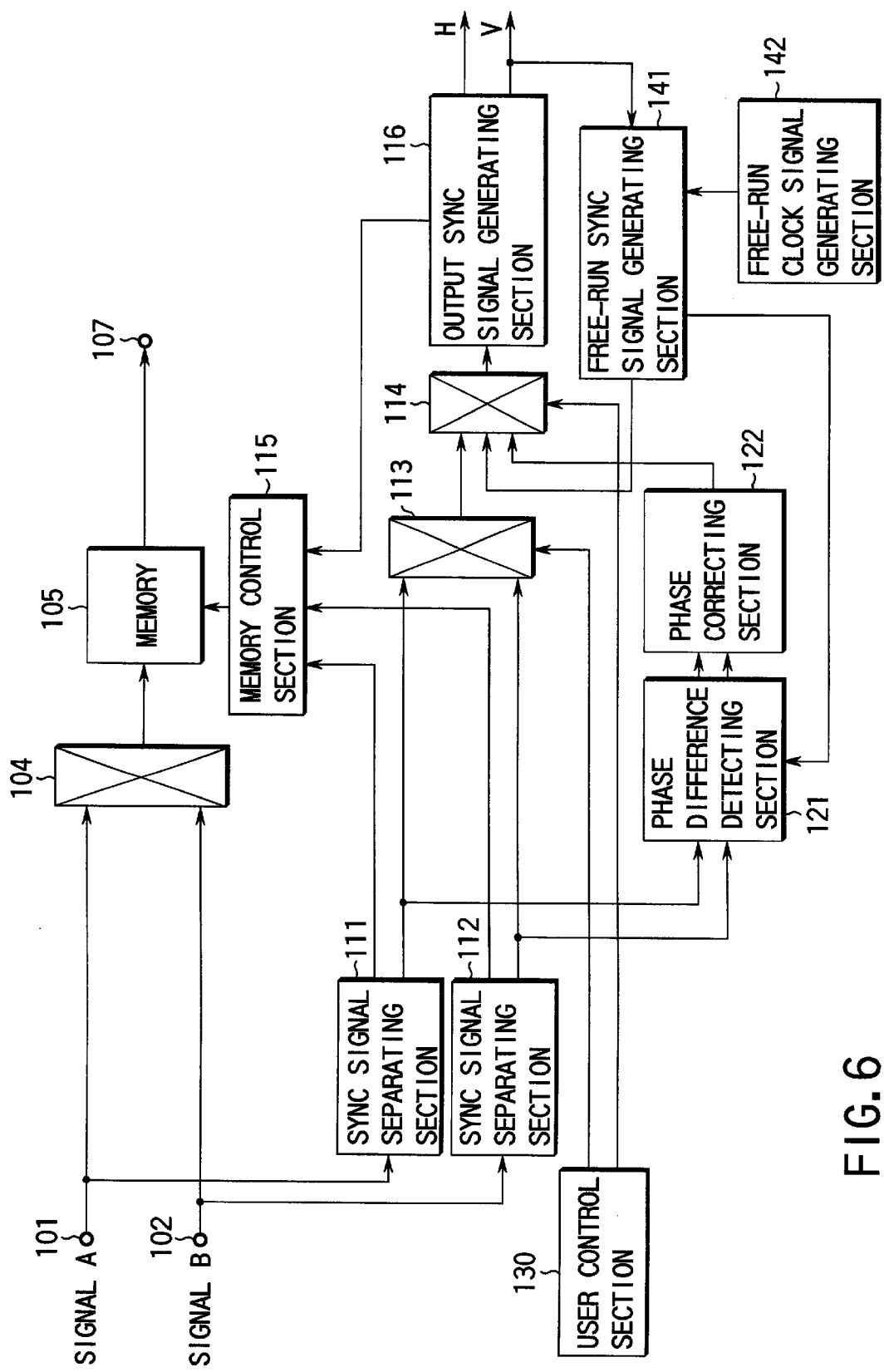
FIG. 6 is a block diagram illustrating a synchronization control circuit according to a third embodiment of the present invention.

FIG. 6 illustrates a synchronization control circuit according to a third embodiment of the present invention. In FIG. 6, the same sections as those of the first and second embodiments are denoted by the same reference numerals. In the third embodiment, in addition to two sync signals of input image signals A and B, a third sync signal, which is asynchronous with them, is used.

In the foregoing first and second embodiments, an amount of phase correction (value) corresponding to a shift of one frame is required and, in other words, a memory for one frame is needed as a delay memory. However, the capacity of the memory for phase correction can be minimized.

In the third embodiment, the vertical sync signal (the currently-used control signal for display) output from the output sync signal generating section 116 is input to a free-run sync signal generating section 141. The section 141 is capable of outputting vertical and horizontal sync signals (fourth displaying control signals) using a clock signal from a free-run clock signal generating section 142. The signal output from the section 141 is supplied again to the section 116 through a selector 114 to produce horizontal and vertical sync signals H and V.

Figure 7:
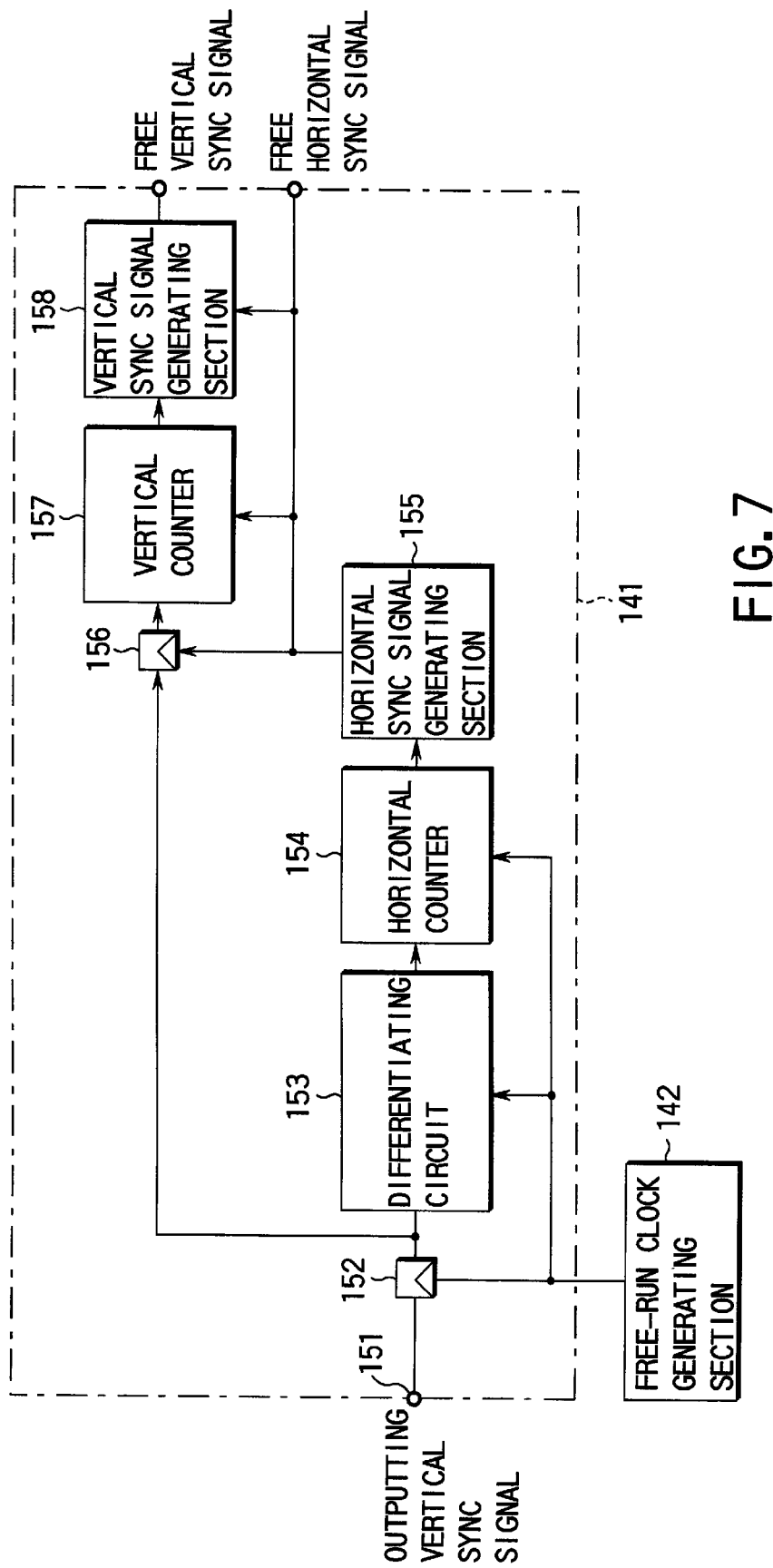
FIG. 7 is a cutaway diagram of the circuit illustrated in FIG. 6.

FIG. 7 is a block diagram specifically showing the constitution of the free-run sync signal generating section 141.

An outputting vertical sync signal V is supplied to a flip-flop 152 via an input terminal 151 and latched by a clock signal from the free-run clock signal generating section 142.

The latched signal is differentiated by a differentiating circuit 153 and input to a horizontal counter 154 as a trigger. The horizontal counter 154 counts clock signals from when one trigger is input until when the next one is input, and supplies a counted value to a horizontal sync signal generating section 155. The section 155 generates and outputs a horizontal sync signal based on the counted value.

A signal output from the flip-flop 152 is latched by a flip-flop 156 using the horizontal sync signal output from the section 155 as a clock signal. The latched signal is input to a vertical counter 157 as a trigger. The vertical counter 157 outputs a signal when it counts the horizontal sync signal a predetermined number of times.

An output signal of the vertical counter 157 is supplied to a vertical sync signal generating section 158. The section 158 outputs a vertical sync signal V when the vertical counter 157 counts a predetermined number of times.

Figure 8:
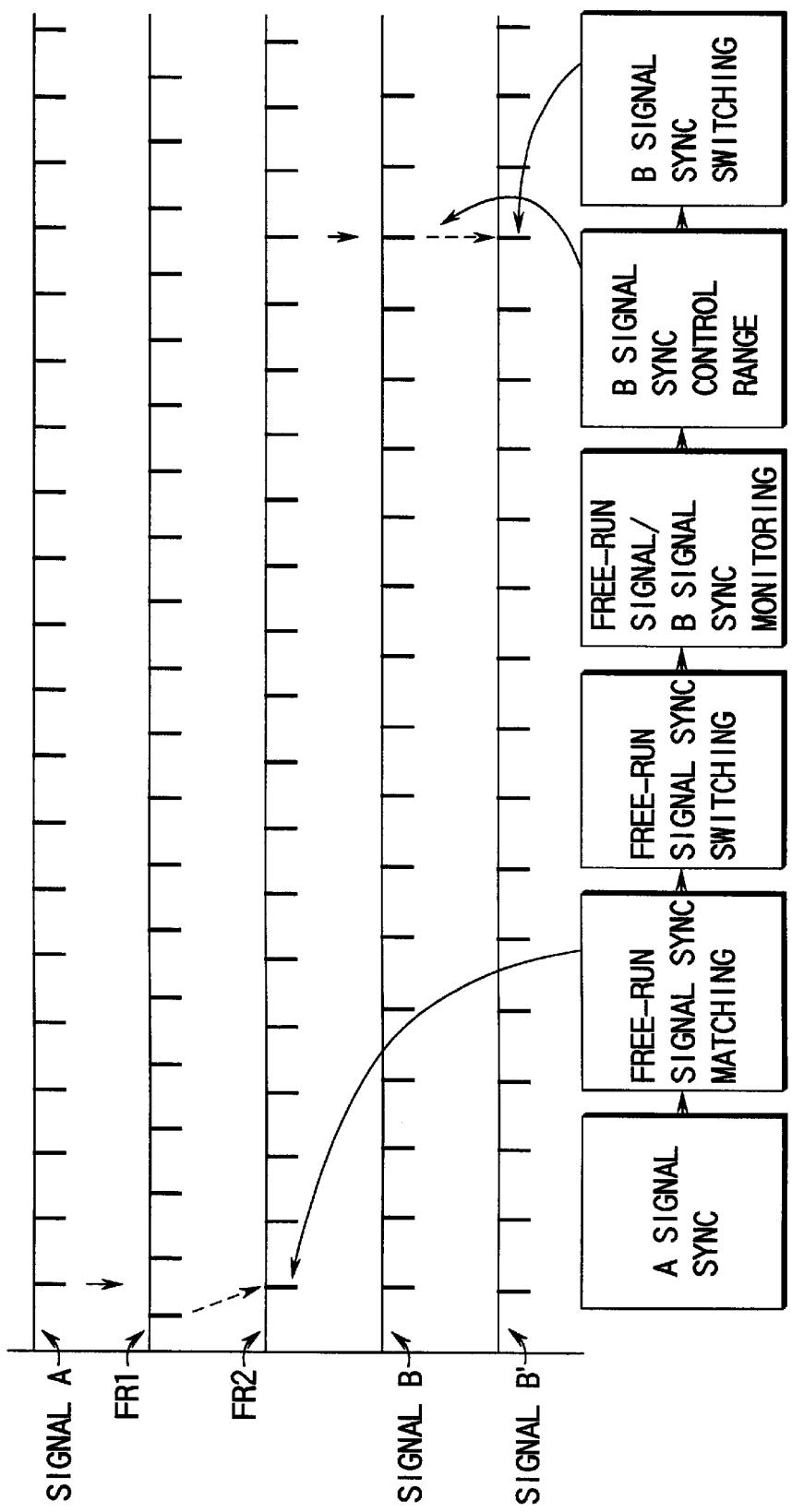
FIG. 8 is a timing chart for explaining an operation of the circuit shown in FIG. 6.

FIG. 8 is a timing chart showing an operation of the circuit according to the above third embodiment.

Assume that the selector 104 selects signal A, the selector 113 selects a sync signal separated by the sync signal separating section 111, and the selector 114 selects a signal output from the selector 113. The vertical sync signal V output from the output sync signal generating section 116 is synchronized with the vertical sync signal of signal A. A predetermined phase difference is set between the sync signal output from the free-run sync signal generating section 141 and the vertical sync signal of signal A.

When a user makes a request for switching between sync signals, a sync signal the phase of which is deviated from that of the sync signal of signal A is selected using a sync signal (FR1 in FIG. 8) which is asynchronous with both input signals A and B. In other words, the selector 114 selects a signal output from the free-run sync signal generating section 141. In this case, the sync signal is displayed by force without distorting an image. This is because the display state free-run sync signal is achieved on the basis of a very stable oscillator included in the free-run clock signal generating section 142.

In the phase difference detecting section 121, a phase difference between the sync signal of signal B and the free-run sync signal generated from the free-run sync signal generating section 141 is detected, and the phase of the free-run sync signal (FR2 in FIG. 8) is corrected until the phase difference falls within a permissible range. After the phase correction is done, the selector 114 selects a signal output from the phase correcting section 122.

As a result, the synchronization state of the free-run sync signal generating section 141 is switched from phase-synchronization with the sync signal of signal A to phase-synchronization with the sync signal of signal B.

In other words, when the above phase difference falls within the permissible range, the free-run sync signal FR2 is switched to the sync signal of signal B. The signal switching is achieved by making a necessary, minimum correction to the sync signal of signal B.

If the above sync signal switching technique is employed, a memory of the phase correcting section simply requires its capacity for securing a time period during which the free-run sync signal is used and for correcting the sync signal of signal B, and the memory can be used with a high degree of freedom.

On the image signal side, an output signal of the selector 104 is written to the memory 105 and read out in response to a sync signal on the display side. In the memory control section 115, a sync signal output from the sync signal separating section 111 is used to generate a write clock signal when signal A is a reference one. After signal A is switched to signal B, a sync signal output from the sync signal separating section 111 is employed. As a sync signal for generating a read clock signal, the signals generated from the output sync signal generating section 116 are used.

The present invention is not limited to the third embodiment described above.

Figure 9:
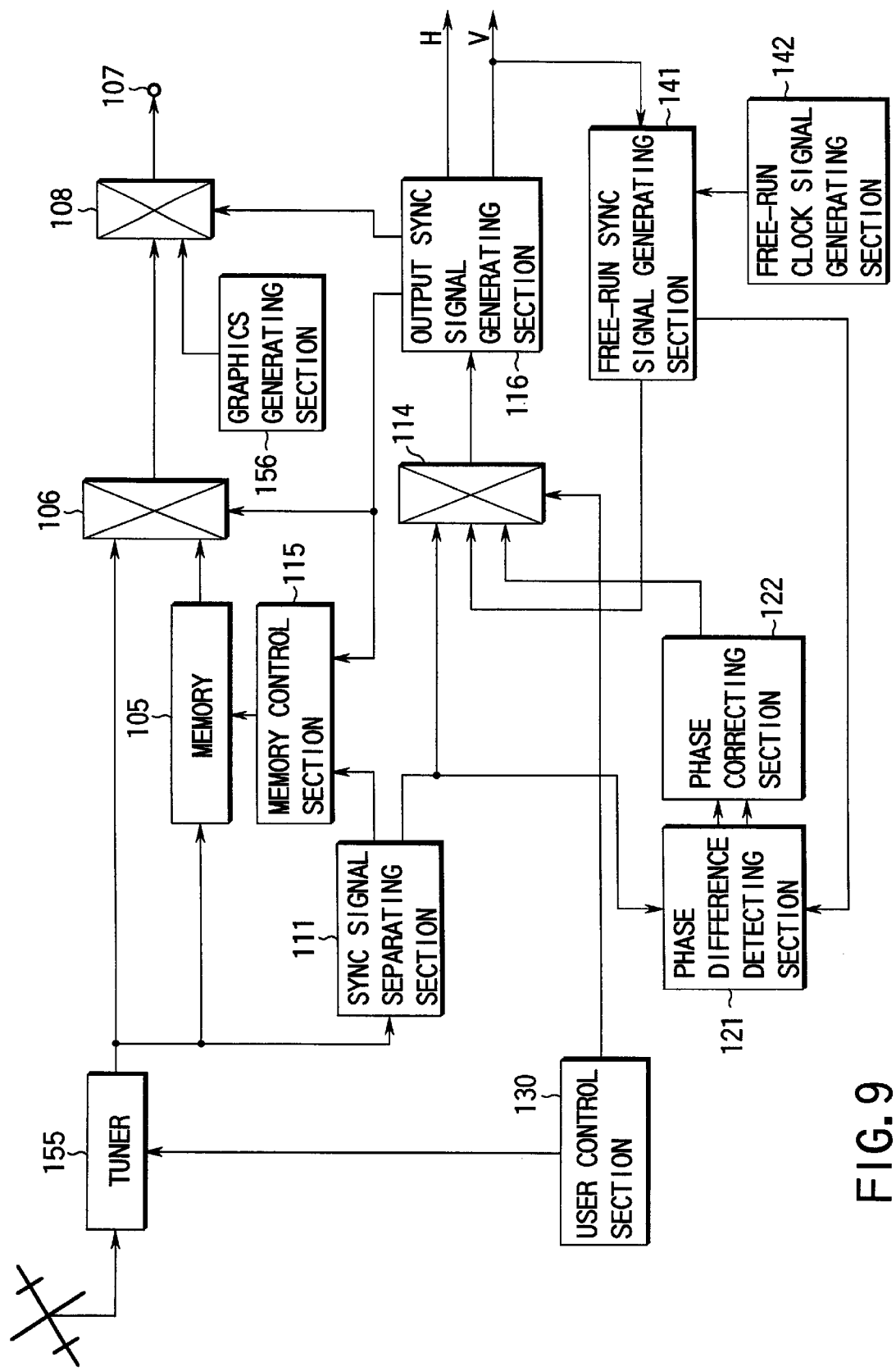
FIG. 9 is a block diagram illustrating a synchronization control circuit according to a fourth embodiment of the present invention.

FIG. 9 illustrates a synchronization control circuit according to a fourth embodiment of the present invention.

In the fourth embodiment, a signal is input not through two lines but through a tuner 155. More specifically, an output signal of the tuner 155 is supplied to one of input terminals of a selector 106 and supplied to the other input terminal thereof via a memory 105. The output signal of the tuner 155 is also supplied to a sync signal separating section 111.

An output signal of the selector 106 is supplied to one of input terminals of a selector 108, and an output signal of a graphics generating section 156 is supplied to the other terminal thereof. Since the other sections are almost the same as those of the circuit shown in FIG. 6, they are indicated by the same reference numerals and their descriptions are omitted.

In the fourth embodiment, the technique of the present invention is applied to channel switching and thus an image can smoothly be obtained when the sync signals are switched to each other.

FIG. 10 is a timing chart showing an example of an operation of the circuit of the above fourth embodiment.

A predetermined time is required to lock a sync signal at the time of channel switching. It is thus impossible to generate a sync signal to be output until stable synchronization is achieved. However, as shown in FIG. 10, when a channel switching request is made, the operation state is temporarily switched to a synchronization state based on a free-run sync signal to generate a stable sync signal to be output, which is decreased in distortion. After the locking of a sync signal involved in channel switching is completed, a phase difference between a free-run sync signal and a new sync signal (sync signal of channel 2 in the figure) is detected, their phases are corrected, and these signals are switched to each other. Basically the circuit of the fourth embodiment operates like those of the above embodiments do.

FIG. 11 illustrates an example of the constitution of a double-screen television receiver using a synchronization control circuit of the present invention.

An image signal selected by a synchronization control circuit 1000 of the present invention is supplied to a compressing section 1001 and a selector 1002. The selector 1002 selects a direct signal or a compressed signal and sends it to a synthesizing section 1003. A selector 1100 selects one of image signals A and B and supplies it to a memory 1101. In the memory 1101, time is adjusted. The writing is synchronized with an input image signal, while the reading is synchronized with a signal which is a reference one on the display side. In this example, the reading is performed in synchronization with a sync signal of the image signal selected by the circuit 1000. The image signal read out of the memory 1101 is input to the compressing section 1102 and selector 1103. The selector 1103 selects a direct signal or a compressed signal and sends it to the synthesizing section 1003.

When a non-compressed signal is selected by the selector 1103 or 1002, an output image signal of the selector 1002 is guided to an output terminal 1004 by priority. When compressed signals are guided from both the selectors 1103 and 1002, their respective screens appear right and left on a screen. For example, the left-side screen is a reference one on which an image of the image signal output from the selector 1002 is formed.

Figure 12A:
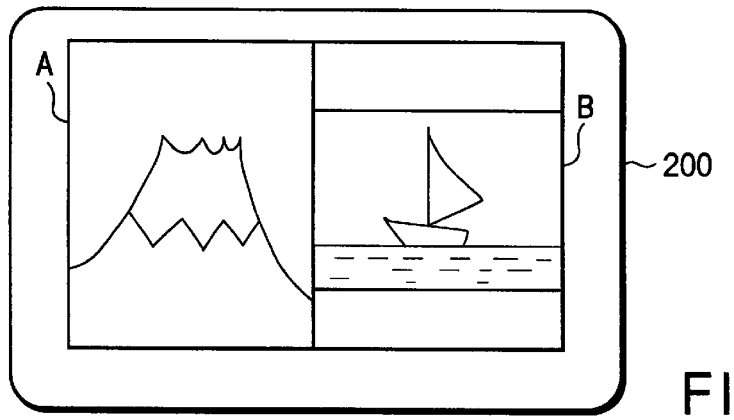
FIGS. 12A and 12B are views each showing a display screen for explaining the advantage of the present invention.
Figure 12B:
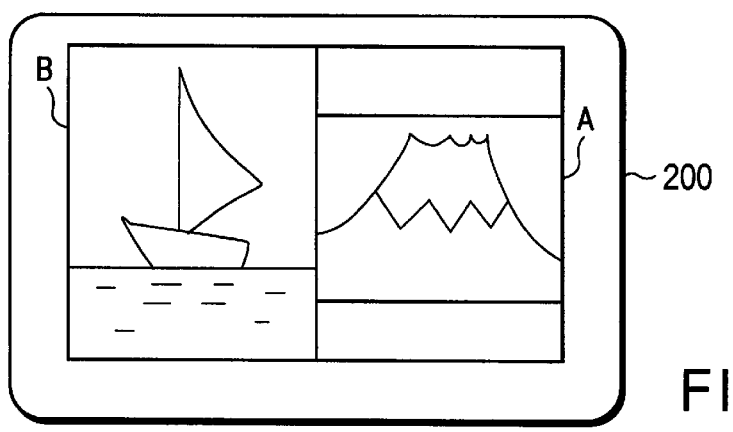

FIGS. 12A and 12B show an example of display of a double-screen display device 200. In FIG. 12A, signal A is displayed on the left-side screen and signal B is displayed on the right-side screen. In FIG. 12B, the right- and left-side screens are changed to each other. In the prior art device, a sync signal is distorted and a blackout is caused temporarily (the screen becomes black) because it does not have a smooth switching circuit unlike in the present invention. If, however, the circuit of the present invention is used, the screens can smoothly be switched to each other with hardly a blackout.

Figure 13A:
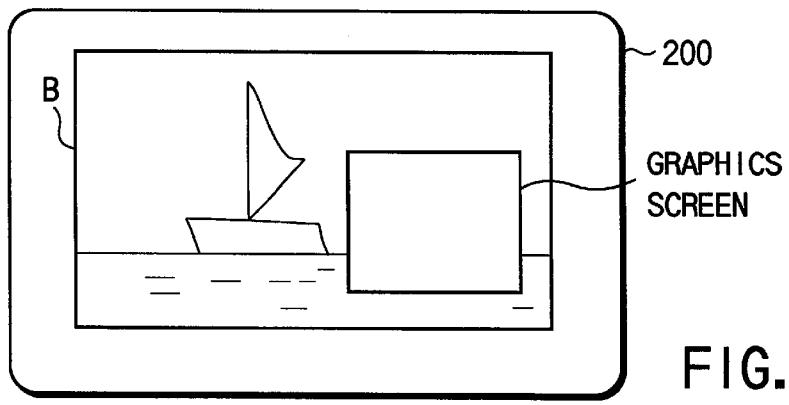
FIGS. 13A and 13B are views each showing a display screen for explaining the advantage of the present invention.
Figure 13B:
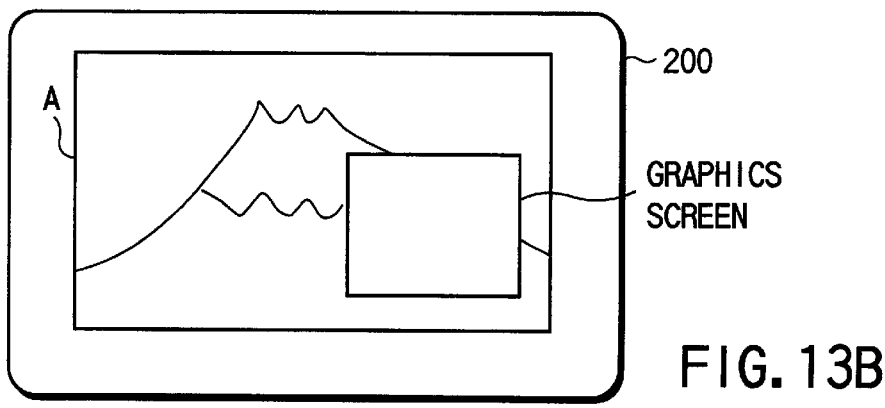

FIGS. 13A and 13B illustrate a screen of signal B and that of signal A, respectively and, in this case, a graphics screen is superimposed on each of the screens. Using the smooth switching circuit of the present invention, the screens are switched smoothly with hardly a temporary blackout. An image including an important content can thus be maintained on the graphics screen, which is remarkably effective in preventing a user from missing the content.

As has been described above, a stable image can be displayed with hardly a sync distortion by using a technique of switching screens by correcting vertical sync signals based on a phase difference between them or a free-run synchronization technique.

Figure 14:
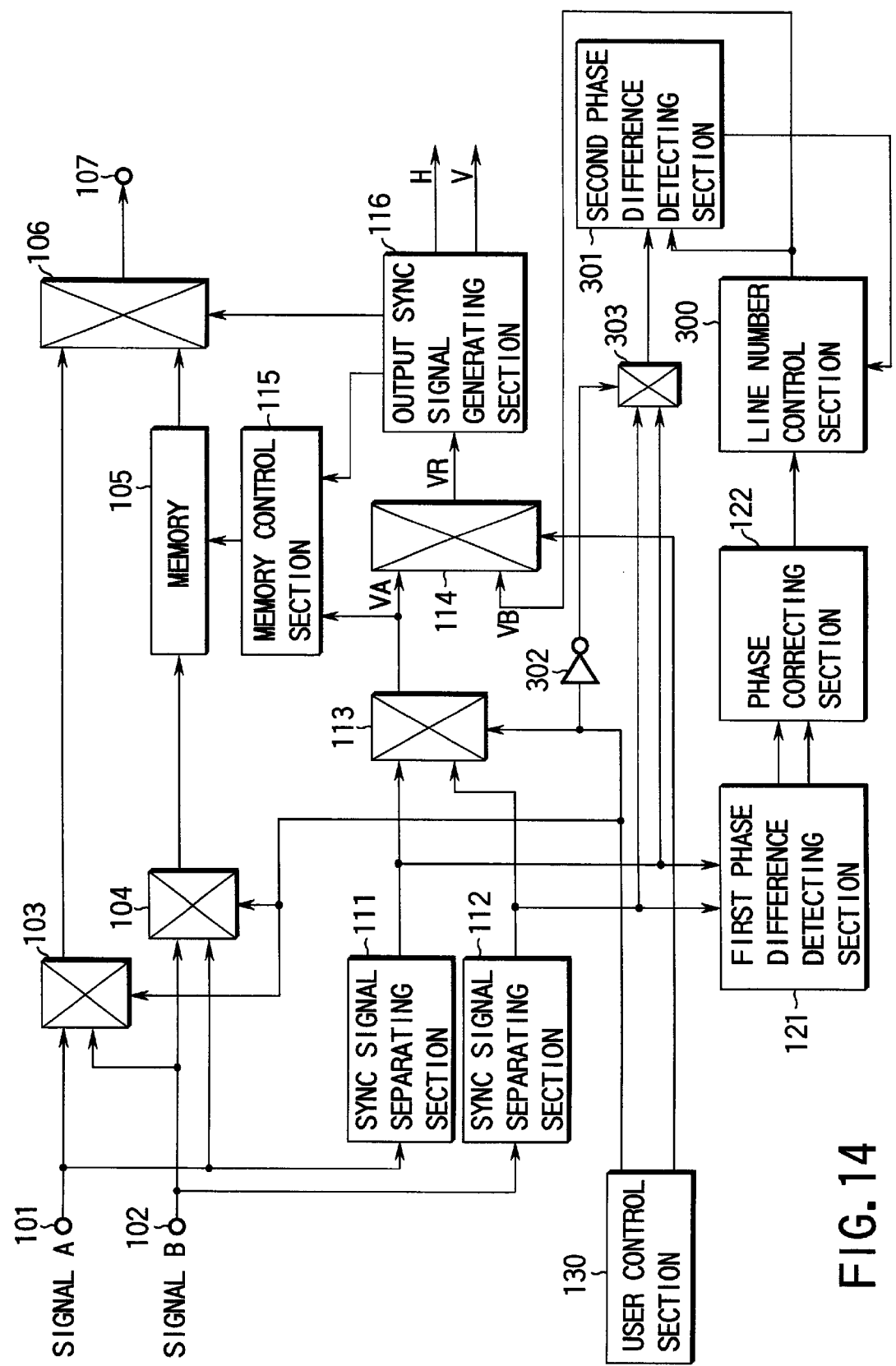
FIG. 14 is a block diagram illustrating a synchronization control circuit according to a fifth embodiment of the present invention.

FIG. 14 illustrates a synchronization control circuit according to a fifth embodiment of the present invention.

In FIG. 14, the sections having the same functions as those of the sections of the previous embodiments are denoted by the same reference numerals. In the fifth embodiment, too, two input video signals A and B are used. Even though a frequency difference between sync signals of the two input video signals is slight, displayed video images can be switched satisfactorily without distorting the images.

In the previous embodiments, it is assumed that a slight phase difference occurs between the sync signal of input video signal A and that of input video signal B. For this reason, for example, the phase of the sync signal of signal B is corrected such that the phases of the sync signals of signals A and B are brought close to or coincide with each other relatively early (when the input video signal A is a main signal), and signal A is switched to signal B as a video signal to be displayed.

If, however, the above processing is performed, when a difference in frequency between sync signals of the input video signals is small, it takes some time until the phases of the sync signals brought close to or coincide with each other.

In the circuit illustrated in FIG. 14, when a phase difference between the sync signals of input video signals A and B is small, the phase of the vertical sync signal of input video signal B is controlled on the basis of the phase of the vertical sync signal of input video signal A. In other words, video signals can be switched without any sync distortion by controlling the number of lines of input video signal B.

In the circuit shown in FIG. 14, the sync signals separated from sync separating sections 111 and 112 are input to a first phase detecting section 121. The first phase detecting section 121 and phase correcting section 122 detect a difference in phase between two sync signals, correct their phases such that the phase of one of the sync signals match that of the other sync signal, and output the phase-corrected sync signals.

The sync signal output from the phase correcting section 122 is input to a line number control section 300. The section 300 controls and outputs the number of lines of the input sync signal based on the phase difference information from a second phase difference detecting section 301. A sync signal output from the line number control section 300 is supplied to one of input terminals of the second phase difference detecting section 301 and a selector 114, whereas a sync signal output from a selector 303 is supplied to the other input terminal thereof. The selector 303 selects and outputs one of the sync signals output from the sync signal separating sections 111 and 112. A switching signal is supplied from a user control section 130 to a control terminal of the selector 303 through an inverter 302. The selector 303 selects a sync signal of signal B which is not the main one.

The second phase difference detecting section 301 detects a phase difference between a vertical sync signal of signal B whose phase has not been corrected, and that of signal B whose line number has been controlled, controls the number of lines until the phases of both the sync signals brought close to or coincide with each other, and then stops controlling the number of lines.

Figure 15:
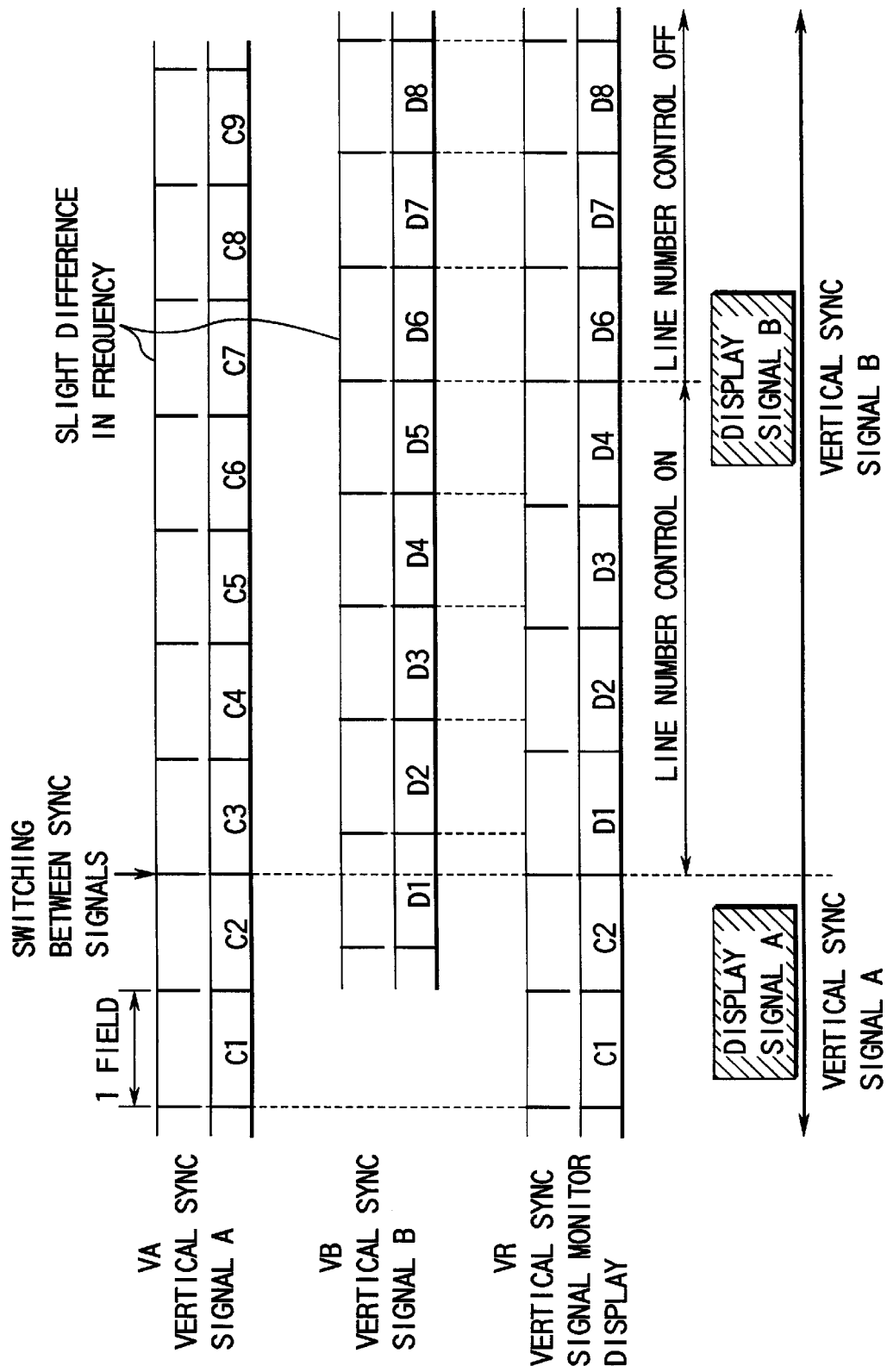
FIG. 15 is a timing chart for explaining an operation of the circuit shown in FIG. 14.

FIG. 15 is a timing chart showing an example of an operation of the circuit of the above fifth embodiment. In this figure, VA and VB indicate vertical sync signals of signals A and B, VR denotes a vertical sync signal for display. When a sync signal request is made by user's channel switching, signal B is displayed at once. Since, however, signals A and B are shifted in phase, the number of lines of signal B is increased such that a field based on the vertical sync signal to be displayed and a field based on signal B coincide with each other. The signal B is delayed by the memory control section 115 and memory 105. If such an operation is performed for a plurality of fields, the vertical sync signal to be displayed gradually coincides with the sync signal of input video signal B. When the vertical sync signal to be displayed coincides with the sync signal of input video signal B, the control of the number of lines is stopped.

If, as described above, a phase difference between input video signals A and B is small, the display state has only to be switched from signal A to signal B concurrently with a switching request to correct a difference in phase between both the signals.

In the fifth embodiment, the number of lines is controlled. If the unit of a phase difference between input video signals A and B is not a line but the difference is smaller than one line, an amount of delay is controlled for each pixel. The amount of delay is secured in the memory 105.

As described above, according to the present invention, when sync signals to be displayed are switched, an image can smoothly be changed without causing any distortion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A synchronization control circuit for obtaining a sync signal when a display state of a first image of a first image signal, which corresponds to a first sync signal, is switched to a second image of a second image signal, which corresponds to a second sync signal, comprising:

sync signal correcting means for generating a third sync signal based on a phase difference between the first and second sync signals, by correcting a phase of the second sync signal and matching a corrected phase of the second sync signal with a phase of the first sync signal to generate the third sync signal; and sync signal generating means for generating horizontal and vertical sync signals based on the third sync signal to display the second image.

2. The synchronization control circuit according to claim 1, wherein the second sync signal is a vertical sync signal to be used from now on.

3. The synchronization control circuit according to claim 1, further comprising an image delay amount correcting means for correcting a phase of the second image signal by a same amount of delay as that caused when the phase of the second sync signal is corrected.

4. A synchronization control circuit which receives at least two input video signals and generates an output control signal for display, comprising:

first display control signal generating means for generating a first display control signal from a first input video signal;

second display control signal generating means for generating a second display control signal from a second input video signal;

phase difference information detecting means for detecting phase difference information between a phase of the first display control signal and a phase of the second display control signal;

correcting means for correcting the second display control signal based on the phase difference information so as to be close to the first display control signal and generating a third display control signal;

switching means for switching a selective state of the first display control signal to that of the third display control signal as an output control signal to be actually displayed; and sync signal generating means for generating horizontal and vertical sync signals based on a third sync signal to display an image based on the second display control signal.

5. The synchronization control circuit according to claim 4, wherein the phase difference information detecting means detects a difference in one of a frequency and a phase of first and second vertical sync signals contained in the first and second display control signals, respectively and corrects a phase of the second vertical sync signal based on the difference.

6. The synchronization control circuit according to claim 4, wherein the phase difference information output from the phase difference information detecting means is information which is averaged in time direction using field delay means.

7. The synchronization control circuit according to claim 4, wherein the phase difference information detecting means and the correcting means include phase synchronization control means for generating a fourth display control signal whose phase is synchronized with that of a currently-output control signal for display, and obtain difference information between the fourth display control signal and the second display control signal to generate the third display control signal, and the switching means switches the selective state of the first display control signal to that of the fourth display control signal and then to a state in which the third display control signal is generated.

8. The synchronization control circuit according to claim 7, wherein the first, second, third and fourth display control signals are each a vertical sync signal.

9. A synchronization control circuit which receives at least two input video signals and generates an output control signal for display, comprising:

first display control signal generating means for generating a first display control signal from a first input video signal;

second display control signal generating means for generating a second display control signal from a second input video signal;

main signal switching means for generating a main signal switching signal for switching a display state of the first input video signal as a main signal to the second input video signal as the main signal;

third display control signal generating means for generating a third display control signal which is asynchronous with the first and second input video signals;

switching means for switching the first display control signal to the third display control signal as a display control signal to be actually used in response to the main signal switching signal, controlling a phase of the third display control signal in accordance with a phase difference between the second display control signal and the third display control signal, and then switching the third display control signal to the second display control signal as a display control signal to be actually used; and sync signal generating means for generating horizontal and vertical sync signals based on the second display control signal from the switching means, to display the second input video signal.

10. A synchronization control circuit having channel switching means for performing channel switching from a display state of a first input video signal to that of a second input video signal, comprising:

display control signal generating means for generating a first display control signal from the first input video signal and generating a second display control signal from the second input video signal;

channel switching means for generating a channel switching signal;

third display control signal generating means for generating a third display control signal which is asynchronous with the first and second input video signals;

switching means for switching the first display control signal to the third display control signal as a display control signal to be actually used in response to the channel switching signal, controlling a phase of the third display control signal in accordance with a phase difference between the second display control signal and the third display control signal, and then switching the third display control signal to the second display control signal as a display control signal to be actually used; and sync signal generating means for generating horizontal and vertical sync signals based on the display control signal from the switching means, to display the second input video signal.

11. A synchronization control circuit which receives at least two input video signals and generates an output control signal for display, comprising:

first display control signal generating means for generating a first display control signal from a first input video signal;

second display control signal generating means for generating a second display control signal from a second input video signal;

first difference information detecting means for detecting a phase difference between the first display control signal and the second display control signal;

correcting means for correcting a phase of the second display control signal based on the phase difference detected by the first difference information detecting means and then generating a third display control signal;

second difference information detecting means for detecting a phase difference between the second display control signal and the third display control signal;

control means for controlling an amount of correction of the correcting means based on the phase difference detected by the second difference information detecting means; and switching means for switching the first display control signal and the third display control signal.

12. The synchronization control circuit according to claim 11, wherein the correcting means controls the number of lines and the number of pixels of the second input video signal.

* * * * *